United States Patent [19]

Lewis

[11] 4,092,498

[45] May 30, 1978

[54] NEUTRONIC REACTOR

[75] Inventor: Warren R. Lewis, Richland, Wash.

[73] Assignee: The United States of America as represented by the United States Department of Energy, Washington, D.C.

[21] Appl. No.: 307,002

[22] Filed: Aug. 29, 1952

[51] Int. Cl.² ............................................. G21C 5/02
[52] U.S. Cl. .................................................. 176/84
[58] Field of Search ................ 204/154.2; 263/44, 46; 174/84, 41, 52

[56] References Cited

U.S. PATENT DOCUMENTS

| 1,807,868 | 6/1931 | Nyzaard | 263/46 |
| 2,139,004 | 12/1938 | Davey | 122/6 A |
| 2,157,017 | 5/1939 | Rice | 263/46 |
| 2,299,102 | 10/1942 | McLimans | 263/46 |
| 2,462,289 | 2/1949 | Rochhow | 263/46 |

Primary Examiner—Harvey E. Behrend
Attorney, Agent, or Firm—Dean E. Carlson; Frank H. Jackson

[57] ABSTRACT

A graphite-moderated, water-cooled nuclear reactor including a plurality of rectangular graphite blocks stacked in abutting relationship in layers, alternate layers having axes which are normal to one another, alternate rows of blocks in alternate layers being provided with a channel extending through the blocks, said channeled blocks being provided with concave sides and having smaller vertical dimensions than adjacent blocks in the same layer, there being nuclear fuel in the channels.

3 Claims, 6 Drawing Figures

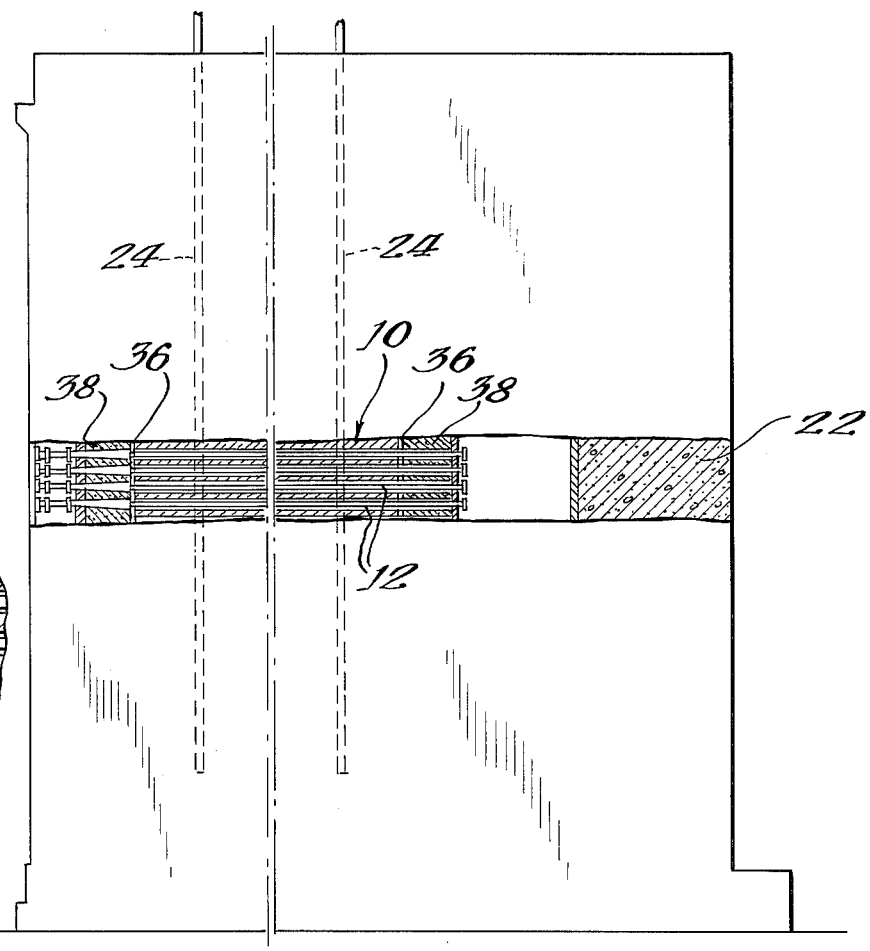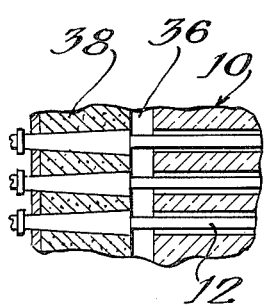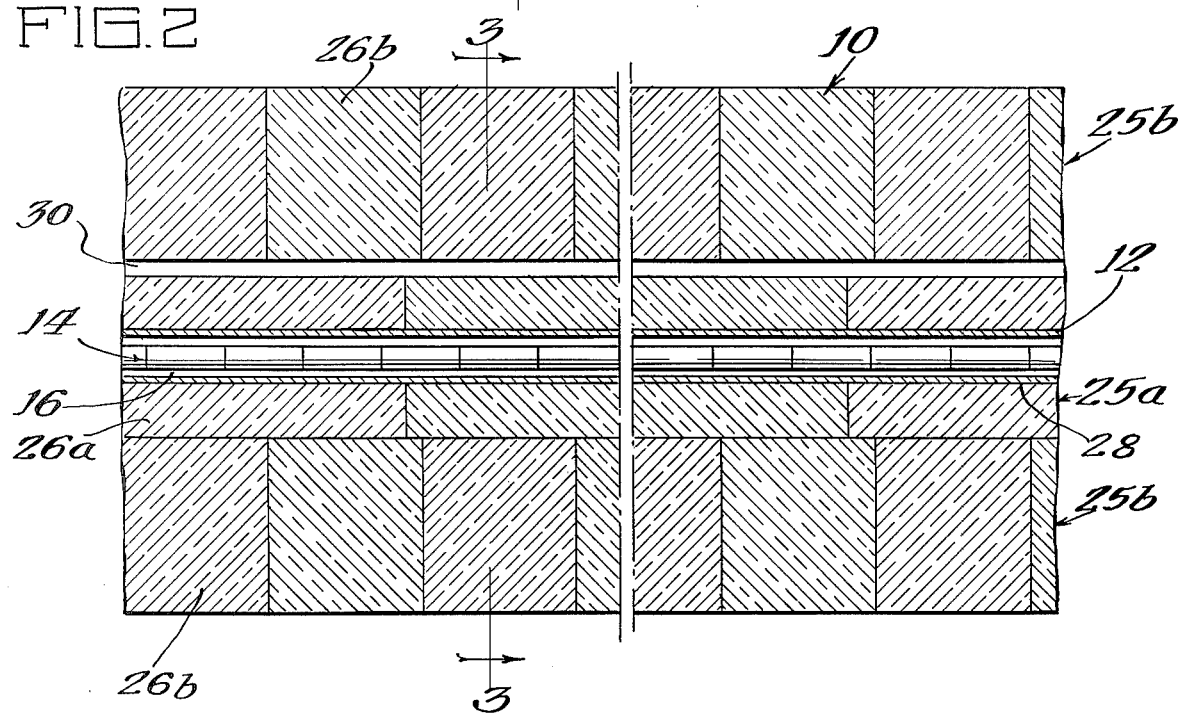

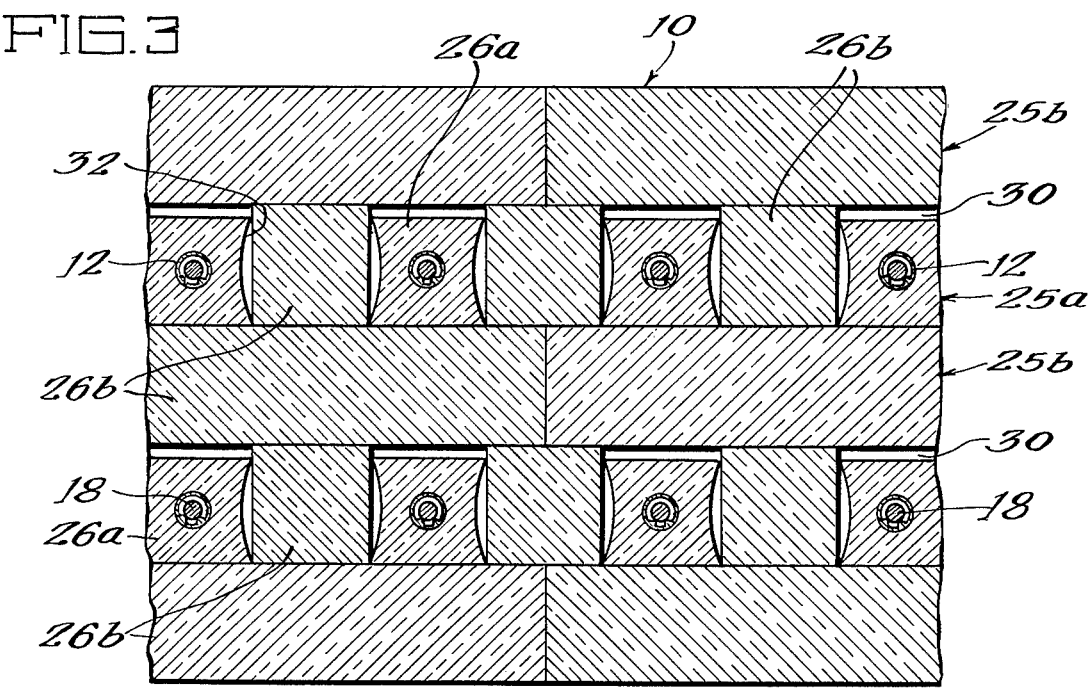
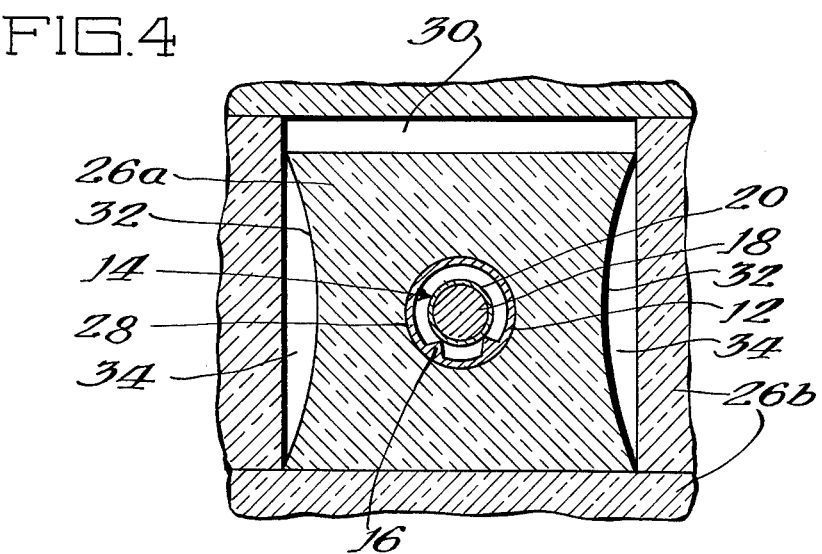
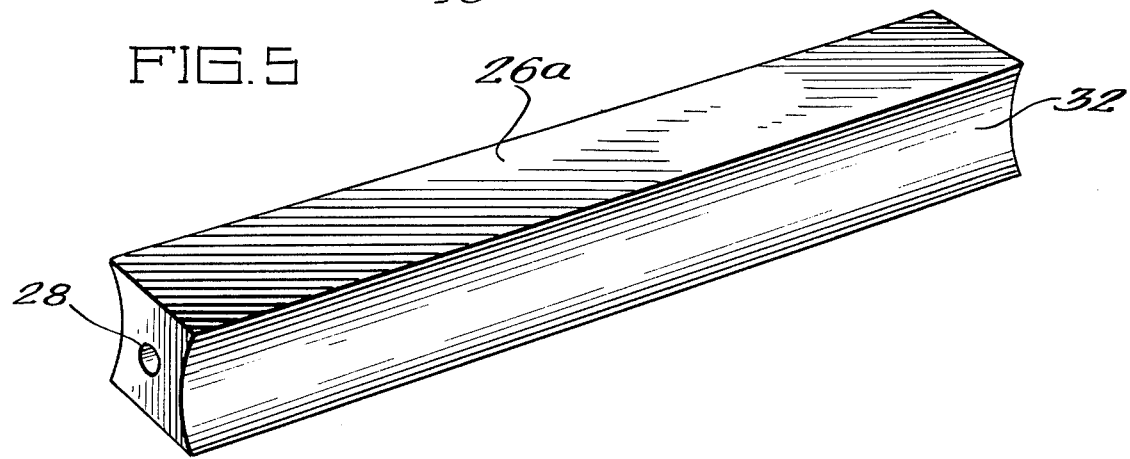

NEUTRONIC REACTOR

The present invention relates to neutronic reactors employing moderators constructed of crystalline materials, and specifically to such reactors constructed to minimize the changes in the physical properties of the moderators as a result of prolonged neutron bombardment thereof.

It has been found that prolonged operation of a neutronic reactor with a solid moderator will cause changes in the physical properties of the material of the moderator, particularly when the reactor is operated at a relatively high power level. Among the changes which occur in the moderator, expansion presents the most immediate problems, since distortion of the shape of the reactor as a result of expansion limits the life of the reactor. Bodies of extruded solid crystalline materials expand normal to the axis of the extrusion of the bodies. For this reason, reactors have been constructed with spaces adjacent to blocks of moderator material on the sides parallel to the axes of extrusion, as described in the copending application of John T. Carleton, Ser. No. 157,287, filed Apr. 21, 1950 now U.S. Pat. No. 3,200,046, dated Aug. 10, 1965.

The changes in the physical properties of solid materials as a result of prolonged high energy neutron bombardment are believed to be due to distortion of the crystalline lattice structure of such materials. When a neutron strikes one of the atoms of a crystal, the bonds which tie the atoms of the crystal together are placed under severe strain, and under certain conditions one of the atoms will be displaced from its position in the lattice structure. This may merely cause rearrangement of the atoms in the lattice structure of the crystal, or it may result in the bombarded atom entirely leaving the lattice structure and taking up a permanent interstitial position. This latter process is believed to be the one which occurs when crystalline materials expand due to neutron bombardment.

While a reactor constructed in accordance with the disclosure of the copending application of John T. Carleton, referred to above, restrains the overall expansion of a solid moderator to permissible limits, such reactors are somewhat difficult to construct. In order to provide spaces adjacent to the blocks of the moderator material on the sides parallel to the axes of extrusion thereof, it is necessary to carefully place each block in the proper place in the moderator, requiring careful and continual measurements.

It is an object of the present invention to construct a neutronic reactor with a solid moderator in which the overall expansion of the moderator will be maintained within permissible limits with prolonged use and which is relatively easy to construct.

A further disadvantage of neutronic reactors constructed with spaces adjacent to the blocks of a solid moderator is that the blocks are free to shift in position unless restrained by an additional means. It is a further object of the present invention to provide a neutronic reactor with a solid moderator constructed with blocks in which the blocks are in abutting relationship with each other, and in which overall expansion of the moderator with prolonged use is maintained within permissible limits.

Further objects and advantages of the present invention will be readily apparent to the man skilled in the art from a further reading of the present specification, particularly when viewed in the light of the drawings, in which:

FIG. 1 is an elevational view, partly cut away and in section, of a neutronic reactor constructed according to the teachings of the present invention;

FIG. 2 is an enlarged fragmentary view of a portion of the reactor shown in FIG. 1;

FIG. 3 is an enlarged fragmentary sectional view of a portion of the neutronic reactor taken along line 3—3 of FIG. 2;

FIG. 4 is a further enlargement of a fragment of the neutronic reactor shown in FIG. 3;

FIG. 5 is an isometric view of one of the tube bearing blocks shown in FIGS. 2 through 4; and FIG. 6 is an enlarged fragmentary view of a portion of the reactor shown in section in FIG. 1.

The neutronic reactor is constructed with a moderator 10 constructed of crystalline materials, such as graphite. A plurality of coolant tubes 12 traverse the moderator 10 parallel to each other. Fuel elements 14 are mounted within the coolant channels 12 on ribs 16. The fuel elements 14 are constructed with bodies 18 of thermal neutron fissionable material, such as natural uranium, enclosed in protective jackets 20. The jackets 20 may be constructed of any material having a small neutron capture cross section and suitable physical properties, such as a high melting point and high resistance to corrosion. Aluminum has been found to be satisfactory for the jackets 20. A radiation shield 38 surrounds the moderator 10, and is constructed of materials having high neutron and radiation capture cross sections, such as boron steel. Also, an additional shield 22 is provided further from the moderator 10 to further protect operating personnel. Control rods 24 constructed of materials having high neutron capture cross sections, such as boron steel, are slidably disposed within the moderator 10, and may be withdrawn to further increase the neutronic chain reaction. The construction and requirements for neutronic reactors of the type described are well understood by the man skilled in the art and form no part of the present invention. The patent applications of Edward C. Creutz, Leo A. Ohlinger, Alvin M. Weinberg, Eugene P. Wigner, and Gale J. Young, Ser. No. 574,153, filed Jan. 23, 1945 now U.S. Pat. No. 2,910,418, dated Oct. 27, 1959, and Enrico Fermi and Leo Szilard, Ser. No. 568,904, filed Dec. 19, 1944 now U.S. Pat. No. 2,708,656, dated May 17, 1955, fully describe operative neutronic reactors of the type described above.

The moderator 10 is constructed of a plurality of layers of rectangular blocks 26a and 26b, the blocks in adjacent layers having their longitudinal axes normal to each other. The coolant tubes 12 are disposed in alternate layers, designated 25a, the coolant tubes 12 being disposed in channels 28 in tube bearing blocks designated 26a. The tube bearing blocks 26a in each layer 25a are separated by solid blocks 26b, the solid blocks 26b being identical with the blocks in the layers which do not contain coolant tubes 12 which are designated 25b.

The tube bearing blocks 26a have the same width as the solid blocks 26b, but a shorter height, as illustrated in FIGS. 2 through 4. As a result, a gap 30 is provided between the top of the tube bearing blocks 26a and the adjacent upper layer 25b of solid blocks 26b. Also, the tube bearing blocks 26a have concave sides 32, so that only the upper and lower edges of the tube bearing blocks 26a are in contact with the adjacent solid blocks 26b in each tube bearing layer 25a. In this manner, gaps 34 are provided at the sides of the tube bearing blocks 26a.

While most of the expansion in the crystalline moderator occurs in the tube bearing blocks 26a, particularly in the regions adjacent to the fuel elements 14, and this expansion is in a direction normal to the axes of extrusion of the tube bearing blocks 26a, the axes of extrusion being longitudinal, there will nonetheless be a certain amount of longitudinal expansion of the tube bearing blocks 26a. In order to prevent undue expansion of the moderator in a direction along the axes of the coolant tubes 12, gaps 36 are provided between the shield 38 and the moderator 10, as shown in FIGS. 1 and 6.

In one construction of the present invention, the blocks 26b have a rectangular cross section of 4.18 inches, a longitudinal length of approximately 4 feet, and are constructed of graphite. The tube bearing blocks 26a are also graphite, and are the same length, but have a height reduced to 4.06 inches. The gap 34 between the sides of the tube bearing blocks 26a and the solid blocks 26b at its maximum point is 0.06 inches. Each of the coolant channels 12 is spaced $8\frac{3}{8}$ inches from adjacent coolant channels 12 in a rectangular lattice, as illustrated in FIG. 3. The graphite moderator 10 is approximately a 25 foot cube.

It will be seen, that the reactor described above may be readily assembled without the necessity of making frequent measurements in order to properly stack the graphite blocks 26a and 26b, since the blocks 26a and 26b are in abutting relationship. Further, the greatest expansion of the graphite moderator is adjacent to the fuel elements 14, and hence occurs primarily in the tube bearing blocks 26a. Since the tube bearing blocks 26a are constructed with axes of extrusion parallel to the longitudinal axis of each of the blocks 26a, they expand outwardly into the gaps 30 and 34. Further, the expansion within the tube bearing blocks 26a is greatest in the region adjacent to the coolant channels 12, so that expansion is relatively insignificant at the outer edges of the blocks 26a. Therefore, the lines of contact between the tube bearing blocks 26a and the solid blocks 26b in each tube bearing layer 25a will not result in excessive strain upon the moderator 10.

The man skilled in the art will readily devise many other embodiments of the present invention from the foregoing disclosure. Hence, it is intended that the scope of the present invention be not limited to the specific disclosure, but only by the following claims.

What is claimed is:
1. A neutronic reactor comprising, in combination, a moderator comprising a plurality of rectangular blocks of extruded crystalline graphite, said blocks having longitudinal extrusion axes and being stacked in abutting relationship in layers, at least a portion of the layers of blocks being disposed with parallel longitudinal axes, a plurality of bodies of thermal neutron fissionable material disposed within a portion of the blocks in layers having blocks disposed with parallel longitudinal axes, said fissionable material containing blocks being provided with concave sides, said fissionable material containing blocks having smaller vertical dimensions than the other blocks in the same layer, thereby providing a space at the sides and the top between said fissionable material containing blocks and adjacent blocks.

2. A neutronic reactor comprising, in combination, a moderator comprising a plurality of rectangular blocks of extruded graphite, said blocks having longitudinal extrusion axes and being stacked in abutting relationship in layers, at least a portion of the layers of blocks being disposed with parallel longitudinal axes, the blocks being disposed in rows, at least some of said rows being provided with channels extending through the blocks therein, the blocks in said channel rows abutting the blocks in adjacent rows and being provided with concave sides, the rows of channeled blocks having smaller vertical dimensions than the other blocks in the same layer, thereby providing a space between said fissionable material containing blocks and the layer next above, a tube disposed within the channels in said rows, and a plurality of thermal neutron fissionable material bodies disposed within the tubes.

3. A neutronic reactor comprising, in combination, a graphite moderator comprising a plurality of rectangular graphite blocks, said blocks having longitudinal extrusion axes and being stacked in abutting relationship in layers, the longitudinal axes of the blocks in each layer being parallel and being normal to the longitudinal axes of the blocks in adjacent layers, the blocks in each layer being aligned in rows, alternate rows in alternate layers being provided with a channel extending through the blocks, and said channeled blocks being provided with concave sides and having smaller vertical dimensions than adjacent blocks in the same layer, a tube disposed within each of the channels, and bodies of thermal neutron fissionable material disposed within the tubes.

* * * * *